3,242,095
PROCESS FOR STABILIZING METAL OXIDE SOLS

Thomas L. O'Connor, Dedham, Mass., assignor, by mesne assignments, to Diamond Alkali Company, Cleveland, Ohio, a corporation of Delaware
No Drawing. Filed Nov. 30, 1961, Ser. No. 156,147
8 Claims. (Cl. 252—301.1)

This application relates to the preparation of stable metal oxide sols, that is, hydrous oxide sols of polyvalent metals and more particularly to the thermal stabilization of such sols.

More specifically the sols to which this invention is directed are the hydrous metal oxide of polyvalent metals which are insoluble in aqueous media. As illustrative of such sols, mention may be made of the hydrous oxide sols of polyvalent metals such as Cr, Ni, Fe, Al, Ba, Ca, Cu, Mg, Th, Pb, U, etc. These sols comprise a metal oxide nucleus surrounded by a ring of counterions. The ring of counterions is necessary to revent particle interaction to form agglomerates of varying size and/or gels. As will be apparent to those skilled in the art, therefore, the counterions should be stable under the conditions at which the sol is employed, since the decomposition of the counterions would cause interaction between the particles of sol with the attendant undesirable formation of gels, etc.

Metal oxide sols such as those described above having a small and substantially uniform particle size have been found to be quite useful for example in medicines, as reagents, as opacifying control agents in polymeric plastics, as antiskid additives for waxes, as antiknock agents in liquid fuels, etc. Often, the uses to which these sols are put are accompanied, by necessity, by elevated temperatures; that is, temperatures considerably in excess of room temperature. In view of this fact, it should be appreciated that the sols should preferably be thermally stable; that is, stable at the temperatures at which they are generally used.

It has been found, however, that certain of the counterions such as, for example, nitrate ions are not thermally stable and tend to decompose at relatively high temperatures, for example, at 300° C. This decomposition of the counterions in turn tends to cause the sol to lose its uniformity of particle size and even to form gels. It is to this problem that the present invention is directed.

It is therefore one object of the present invention to provide processes for forming thermally stable hydrous metal oxide sols.

Another object is to prepare hydrous metal oxide sols which are thermally stable and maintain their discrete and uniform particle size at the highly elevated temperatures at which they are commercially utilized.

A still further object is to provide a process for stabilizing hydrous metal oxide sols which are normally thermally unstable by contacting the sols with dihydrogen phosphate ions.

Other objects of the invention will in part be obvious and will in part appear hereinafter.

For a fuller understanding of the nature and objects of the invention, reference should be had to the following detailed description.

It is know to treat certain metal oxides with divalent phosphate ions. For example, U.S. Patent No. 2,824,784 teaches that slurries of an oxide of an actinide element may be treated with a solution of a substance which is adsorbable by the oxide, e.g., disodium phosphate, to obtain a slurry characterized by having very little settling. The patent further suggests that the pH value of the slurry may be controlled by adding a suitable buffer such as a mixture of monosodium and disodium phosphate.

However, as far as is known, it has never heretofore been suggested that thermally stable metal oxide sols may be prepared by contacting the thermally unstable metal oxide sol with dihydrogen phosphate ions in the amount and under the conditions set forth with more particularity hereinafter. Under these conditions the thermally unstable counterions are replaced with the stable dihydrogen phosphate ions, thereby forming a thermally stable metal oxide sol.

The essence of the present invention may therefore be described as the concept of replacing the thermally unstable counterions such as, for example, nitrate ions with stable dihydrogen phosphate ions. This may be accomplished simply and efficiently by reacting the normally thermally unstable sol with phosphoric acid or a soluble mono-substituted derivative thereof, such as monosodium phosphate, which will ionize to form dihydrogen phosphate ions which in turn will replace the thermally unstable ions as neutralizing or conterions for the sol.

It has been found necessary to use mono-substituted derivatives of phosphoric acid which will ionize to form dihydrogen phosphate ions rather than di-substituted derivatives such as those described above in the aforementioned U.S. Patent No. 2,824,784, since the stability of metal oxide sols in polar liquids is strongly influenced by the electro-valency of the electrolyte in the system. In other words, it has been shown that instability increases markedly as the anionic species is changed from monovalent to divalent and from divalent to trivalent. Therefore, only trace quantities of divalent electrolyte can be tolerated in a sol.

As was indicated above, the phosphoric acid or the mono-substituted derivatives thereof must be present in certain specified amounts in order to accomplish the desired result. In order to provide the desired thermal stability, the dihydrogen phosphate ions must be present in an amount from about 7 to about 30 microequivalents per square meter of sol surface. In addition thereto, it has been found that the pH range of the mixture must be from about 3 to about 6.5. In other words, it is critical to the practice of this invention that two conditions exist: (1) the dihydrogen phosphate ions be present in the range of about 7 to about 30 microequivalents per square meter of sol surface; and (2) the pH of the mixture be in the range of about 3 to about 6.5.

While it is possible to effect the necessary replacement of the thermally unstable counterions with the thermally stable dihydrogen phosphate ions merely by contacting the sol with the dihydrogen phosphate ions, it is preferred that the reaction be carried out with the application of heat in order to remove the unstable counterions, e.g., nitrate ions from the system.

The metal sols containing the thermally unstable counterions and to which this invention is directed may be prepared initially by any of the processes by which sols have been heretofore obtained. Such methods include, for example, dialysis, electroosmosis, and ion-exchange removal of solubilizing anions of salt solutions of the polyvalent metals. Particularly useful processes for preparing metal oxide sols are described in copending applications, Serial No. 88,224, filed February 9, 1961, now abandoned; Serial No. 773,137, filed November 12, 1958, now abandoned; and Serial No. 19,449, filed April 4, 1960, now abandoned.

The following examples show by way of illustration and not by way of limitation the novel process of this invention.

Example 1

A thorium oxide sol was prepared in the manner described in the aforementioned application, Serial No.

19,449. 200 ml. of a thorium nitrate soltuion containing thorium equivalent to 40 grams of thorium oxide was added at a rate of 0.80 ml./min. to a vertical glass reactor simultaneously with a solvent containing 15 vol. percent mixed primary amines having carbon atoms in the range of $C_{18}$–$C_{20}$, 5 vol. percent isodecanol, and 80 vol. percent distilled mineral spirits. The addition of the solvent was maintained at 125 ml./min. and the mixture maintained at 100° C. during the course of the addition of thorium nitrate solution and solvent which took 250 minutes. After separation of the aqueous phase, the sol analyzed 200 grams per liter in thorium oxide and 15 grams per liter in nitrate. The particle size was measured to be 9.5 millimicrons.

The thorium oxide sol prepared above was divided into two fractions. The first fraction was heated to about 300° C. for a short time and a gel was formed, indicating the thermal instability of the sol. Phosphoric acid was added to the second fraction equivalent in moles to the nitrate content of the sol ($19\mu$ eq./m.$^2$ of sol) and the mixture which had a pH of 4.9 was then heated to 300° C. in an autoclave for three hours. After autoclaving, the sol was fluid and non-settling at high temperatures, and contained no detectable nitrate ions.

*Example 2*

A ferric oxide sol was prepared by contacting an aqueeous solution containing 506 grams of ferric nitrate $Fe(NO_3)_3 \cdot 9H_2O$ per liter with a solvent containing 10% by volume of mixed tertiary amines having carbon atoms in the range $C_{24}$–$C_{30}$, 10% by volume isodecanol and 80% by volume distilled mineral spirits. The organic to aqueous volume ratio was 20:1. An aqueous phase and an oragnic phase was formed. After phase separation, the aqueous phase contained a ferric oxide sol having 100 grams of $Fe_2O_3$ and 6.8 grams of nitrate ions per liter. The ferric oxide sol prepared above was divided into two fractions as in Example 1. Fraction 1 was heated as in Example 1 and was found to be thermally unstable. Monosodium phosphate was added to the second fraction equivalent to the nitrate content of the sol ($11.5\mu$ eq./m.$^2$ of sol) and the mixture which had a pH of 3.3 was again autoclaved at 300° C. for three hours. No trace of nitrate ions was detected in the sol after autoclaving. The sol remained fluid and non-settling. The particle size was determined to be about 12 millimicrons.

*Example 3*

A chromium oxide sol was prepared by adding 120 milliliters of a chromium nitrate solution containing chromium equivalent to 76 grams of chromium oxide per liter to an organic solvent containing 10 percent by volume secondary amines, 5 percent by volume isodecanol, and 85 percent by volume distilled mineral spirits. The temperature was maintained at about 100° C. for four hours. An aqueous phase and an organic phase were formed. The aqueous phase was separated and contained 64 grams of $Cr_2O_3$ and 6.82 grams of nitrate ion per liter. The particle size was measured to be 9 millimicrons. As in the foregoing examples, the chromium oxide sol was divided into two fractions, the first fraction being heated and found to be thermally unstable. To the second fraction was added sodium dihydrogen phosphate equivalent in moles to the nitrate content of the sol ($11.4\mu$ eq./m.$^2$ of sol). The pH of the mixture was 4.8. The mixture was heated to 300° C. in an autoclave for 3.5 hours. After autoclaving no trace of nitrate ion was found, and the sol was stable and fluid.

It is understood that the present disclosure is for the purpose of illustration only and that this invention includes all modifications and equivalents which fall within the scope of the appended claims.

What is claimed is:

1. A process for rendering a hydrous metal oxide sol stable to gelation up to temperatures of about 300° C., said sol having a metal oxide nucleus surrounded by counterions which are thermally unstable at that temperature; which process comprises reacting said sol with a source of dihydrogen phosphate ions in an amount such that the number of moles of dihydrogen phosphate ions thereby supplied is approximately equal to the number of moles of said thermally unstable counterions, whereby said counterions are replaced by said dihydrogen phosphate ions; the final pH of the sol thus treated being between about 3 and about 6.5.

2. The process as defined in claim 1 wherein said reaction is carried out in the presence of heat.

3. The process as defined in claim 1 wherein said source of dihydrogen phosphate ions is a compound selected from the group consisting of phosphoric acid and soluble mono-substituted derivatives thereof.

4. The process as defined in claim 1 wherein said sol is a hydrous oxide sol of a polyvalent metal selected from the group consisting of chromium, nickel, iron, aluminum, barium, calcium, copper, magnesium, thorium, lead and uranium.

5. The process as defined in claim 1 wherein said counterions are nitrate ions.

6. The process as defined in claim 1 wherein said sol is a thorium oxide sol.

7. The process as defined in claim 1 wherein said sol is a ferric oxide sol.

8. The process as defined in claim 1 wherein said sol is a chromium oxide sol.

References Cited by the Examiner

UNITED STATES PATENTS 2,824,784   2/1958   Hansen et al. _____ 23—14.5

FOREIGN PATENTS 884,975   12/1961   Great Britain.

OTHER REFERENCES

The Condensed Chemical Dictionary, 4th Edition, 1950, page 184.

AEC Document, ORNL–1554, page 123 (1951).

AEC Document, ORNL–2057 (Del.), pp. 118 and 119, Apr. 17, 1956.

Lane et al.: "Fluid Fuel Reactors," pp. 130–132 (1958).

CARL D. QUARFORTH, *Primary Examiner.*

REUBEN EPSTEIN, *Examiner.*